United States Patent
Chen

(10) Patent No.: US 6,672,904 B1
(45) Date of Patent: Jan. 6, 2004

(54) MEMORY CARD CONNECTOR

(75) Inventor: Yuan-Hua Chen, Taoyuan Hsien (TW)

(73) Assignee: Kingconn Technology Co., Ltd., Taoyuan Hsien (TW)

( * ) Notice: Subject to any disclaimer, the term of this patent is extended or adjusted under 35 U.S.C. 154(b) by 0 days.

(21) Appl. No.: 10/358,216

(22) Filed: Feb. 5, 2003

(30) Foreign Application Priority Data

Dec. 11, 2002 (TW) ........................................ 91220083 U

(51) Int. Cl.[7] ............................................... H01R 24/00
(52) U.S. Cl. ........................ 439/631; 439/61; 439/160
(58) Field of Search ........................... 439/631, 61, 60, 439/630, 632, 633, 945, 946, 639, 159, 160; 361/737

(56) References Cited

U.S. PATENT DOCUMENTS

| | | | | | |
|---|---|---|---|---|---|
| 5,933,328 | A | * | 8/1999 | Wallace et al. | 361/737 |
| 6,062,887 | A | * | 5/2000 | Schuster et al. | 439/218 |
| 6,069,795 | A | * | 5/2000 | Klatt et al. | 361/737 |
| 6,097,605 | A | * | 8/2000 | Klatt et al. | 361/737 |
| 6,386,920 | B1 | * | 5/2002 | Sun | 439/630 |
| 6,468,101 | B2 | * | 10/2002 | Suzuki | 439/326 |
| 6,471,550 | B2 | * | 10/2002 | Maiterth et al. | 439/631 |
| 6,482,029 | B2 | * | 11/2002 | Nishimura | 439/541.5 |
| 6,524,137 | B1 | * | 2/2003 | Liu et al. | 439/638 |
| 6,540,523 | B1 | * | 4/2003 | Kung et al. | 439/64 |
| 2002/0168900 | A1 | * | 11/2002 | Chen | 439/630 |

* cited by examiner

*Primary Examiner*—Ross Gushi
(74) *Attorney, Agent, or Firm*—Troxell Law Office PLLC

(57) ABSTRACT

A memory card connector is constructed to include a housing, first terminals, second terminals, third terminals and fourth terminals installed in said housing for the contact of a SM card, a memory stick, a SD card/multimedia memory card, or xD memory card respectively, and a lever fastened pivotally with the housing and supported on a spring member for controlling the insertion of an assigned memory card into the housing.

11 Claims, 6 Drawing Sheets

MEMORY CARD CONNECTOR

BACKGROUND OF THE INVENTION

1. Field of the Invention

The present invention relates to a memory card connector and, more specifically, to a multipurpose memory card connector, which fist any of a variety of memory cards including SM card, memory stick, SD card, multimedia memory card, xD memory card.

2. Description of the Related Art

Regular card readers are commonly designed to read different memory cards such as SM card, memory stick, SD card, and multimedia memory card. However, conventional multipurpose memory card readers cannot read a xD memory card, which is a storage medium developed by Japan Olympus and Fuji. The capacity of a xD memory card can easily be expanded to over 8 GB. This high capacity memory card is practical for use in image processing. It is regrettable that conventional card readers cannot read a xD memory card.

SUMMARY OF THE INVENTION

The present invention has been accomplished under the circumstances in view. It is the main object of the present invention to provide a memory card connector, which fits any of a variety of memory cards including SM card, memory stick, SD card, multimedia memory card, and xD memory card. It is another object of the present invention to provide a memory card connector, which has a thin thickness.

To achieve these and other objects of the present invention, the memory card connector comprises a housing, the housing comprising a front side, a rear side, an open chamber extending to the front side for the insertion of a memory card into the inside of the housing, two stepped portions bilaterally disposed at a front side of the open chamber, a plurality of elongated slots and a recessed chamber arranged in a top wall thereof, and two locating notches symmetrically disposed at two sides thereof; a plurality of first terminals mounted in the housing for the contact of a memory card, the first terminals each having a first end inserted from the rear side of the housing into the inside of the open chamber and the elongated slots, and a second end curved downwards and then upwards outside the housing; a plurality of second terminals mounted inside the housing for the contact of a memory card, the second terminals each having a first end respectively inserted from the rear side of the housing into the inside of the open chamber and suspended below the first terminals, and a second end curved upwards and then downwards outside the housing; a plurality of third terminals mounted inside the housing for the contact of a memory card, the third terminals each having a first end inserted from the rear side of the housing into the inside of the open chamber and suspended below the second terminals, and a second end curved upwards and then downwards and respectively suspended between the second ends of each two adjacent second terminals, the third terminals include longer third terminals and shorter third terminals; plurality of fourth terminals mounted inside the housing for the contact of a memory card, the fourth terminals each having a first end turned inwards at right angles and then backwards, and a second end turned upwards and then downwards outside the housing, the fourth terminals including a number of spaciously pitched fourth terminals to be alternatively arranged with the longer third terminals at same elevation; a lever fastened pivotally with a part inside the housing and transversely suspended in the front side of the open chamber for controlling the insertion of an assigned memory card into the open chamber.

BRIEF DESCRIPTION OF THE DRAWINGS

The present invention can be more fully understood by reference to the following detailed description and accompanying drawings, in which:

FIG. 4(*b*) is a rear view of the memory card connector according to the present invention; and FIG. 4(*c*) is a sectional view of the memory card connector according to the present invention.

DETAILED DESCRIPTION OF THE PREFERRED EMBODIMENT

Figure 1:
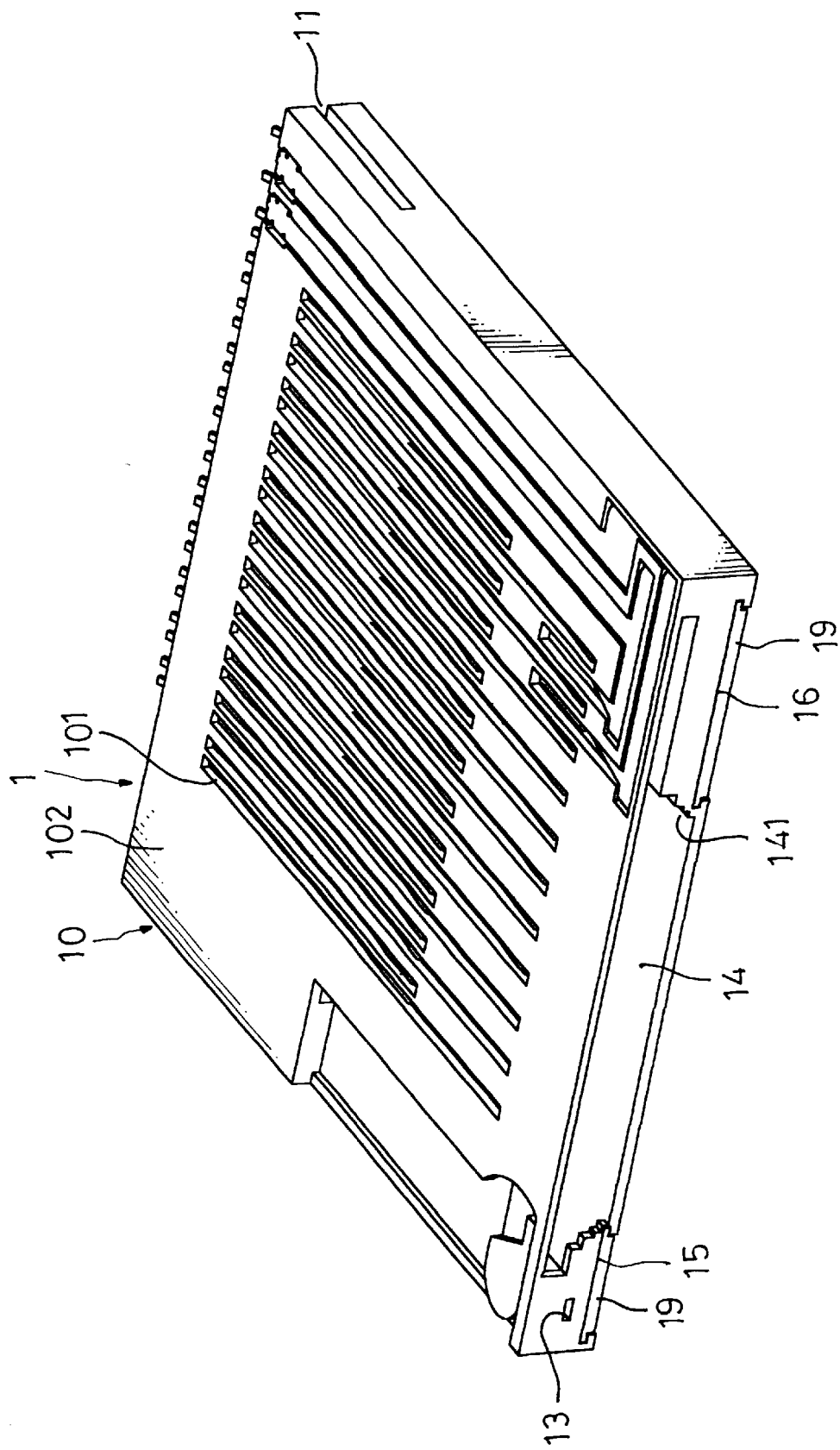
FIG. 1 is an elevational view of a memory card connector according to the present invention.
Figure 2:
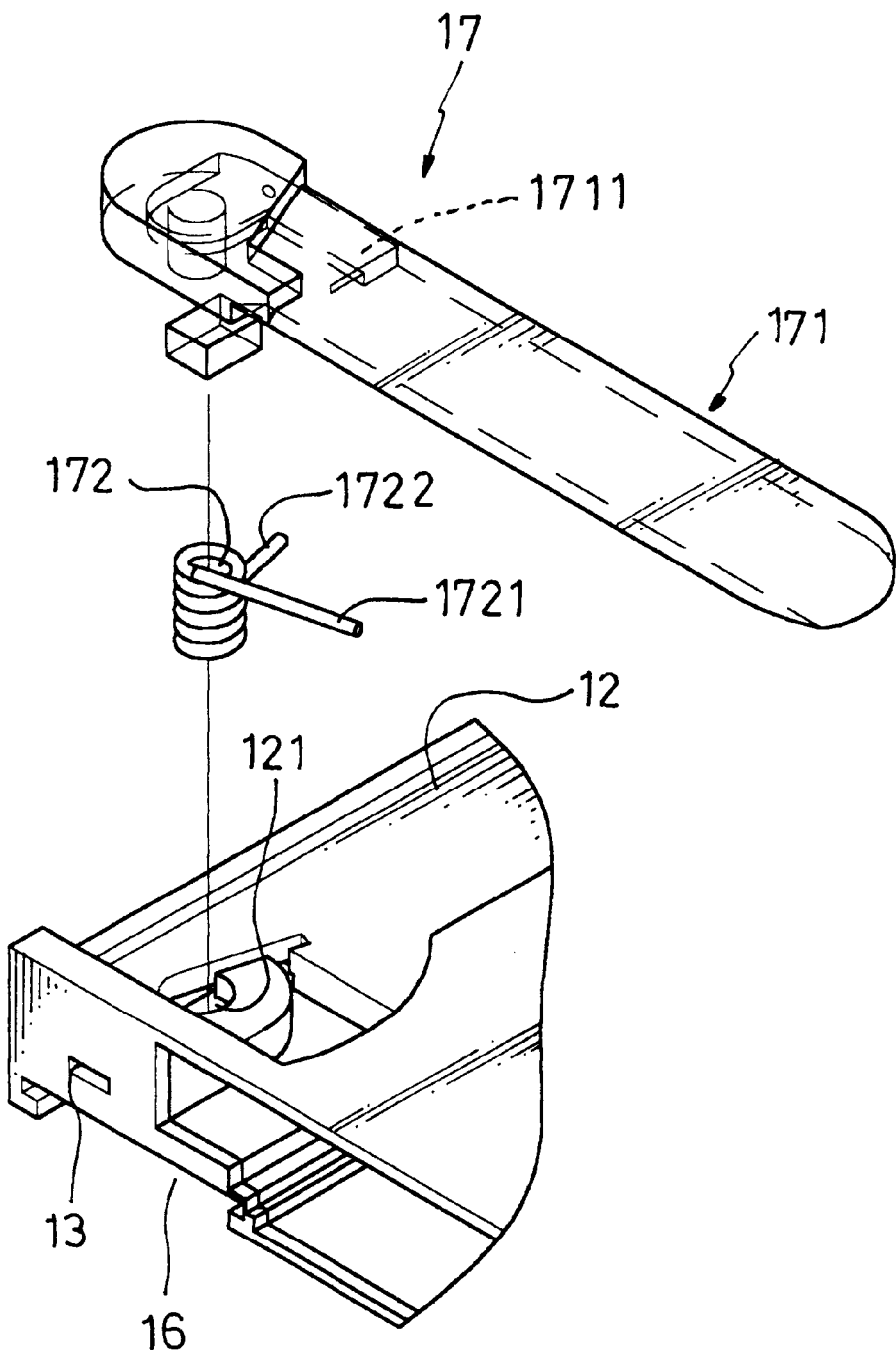
FIG. 2 is an exploded view showing the arrangement of the lever in the housing of the memory card connector according to the present invention.
Figure 3:
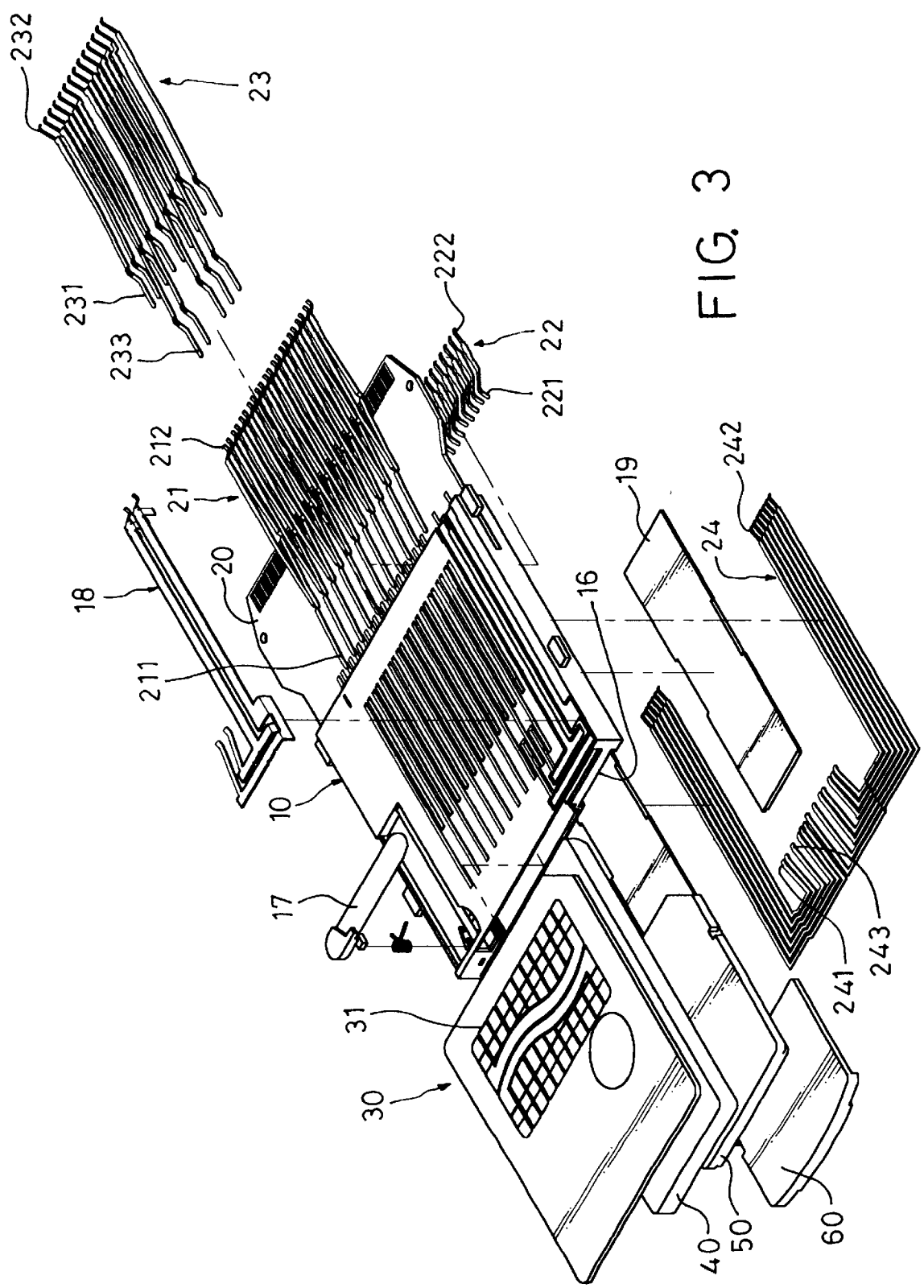
FIG. 3 is an exploded view of the memory card connector according to the present invention.

Referring to FIGS. 1~3, a memory card connector 1 is shown comprised of a housing 10, a set of first terminals 21, a set of second terminals 22, a set of third terminals 23, a set of fourth terminals 24, and a lever 17.

The housing 10 comprises an open chamber 14, two stepped portions 141 bilaterally disposed at the front side of the open chamber 14, a plurality of elongated slots 101 arranged in the top wall 102 of the open chamber 14, two locating notches 11 symmetrically disposed at two sides, and a printed circuit board 20 mounted inside the open chamber 14 and fixed to the locating notches 11. The first, second, third and fourth terminals 21, 22, 23 and 24 are respectively mounted in the open chamber 14 inside the housing 10 and electrically connected to the printed circuit board 20. The first terminals 21 each have a first end 211 inserted from the rear side of the housing 10 into the inside of the open chamber 14 and the elongated slots 101 and a second end 212 curved downwards and then upwards outside the housing 10. The first terminals 21 are preferably for the contact of a SM (smart media) card. The second terminals 22 each have a first end 221 inserted from the rear side of the housing 10 into the inside of the open chamber 14 and suspended below the first terminals 21, and a second end 222 curved upwards and then downwards outside the housing 10. The second terminals 22 are preferably for the contact of a MS (memory stick). The third terminals 23 each have a first end 231 inserted from the rear side of the housing 10 into the inside of the open chamber 14 and suspended below the second terminals 22, and a second end 232 curved upwards and then downwards and suspended between the second ends 222 of two adjacent second terminals 22. The third terminals 23 are made subject to two lengths. For example, five pieces of third terminals 23 are relatively longer than the other third terminals. The third terminals 23 are preferably for the contact of a SD (San Disk) card or multimedia card 50. The fourth terminals 24 each have a first end 241 turned inwards at right angles and then backwards, and a second end 242 turned upwards and then downwards outside the housing 10. The fourth terminals 24 include a predetermined number, for example, five pieces of spaciously pitched fourth terminals 243 to be alternatively arranged with the five longer third terminals 233 at same elevation. The fourth terminals 24 are adapted to contact an xD memory card 60. The housing 10 further comprises an indicator light 13 adapted to indicate the working status of the memory card connector. The lever 17 is transversely suspended in the open chamber 14 at one lateral side, and adapted to prohibit the insertion of a SD card or multimedia memory card 50 or an xD memory card 60 into the open chamber 14.

Referring to FIGS. 1 and 2 again, the lever 17 is comprised of a lever body 171, and a torsional spring 172. The lever body 171 is fastened pivotally with a part inside the housing 10, having a bottom receiving chamber 1711 near one end. The torsional spring 172 has one end fastened to the bottom receiving chamber 1711 of the lever body 171, and the other end fastened,to a locating hole 121 in a recessed chamber 12 in the housing 10.

When inserted a SM (smart media) card 30 inserted into the open chamber 14, it forces the lever body 171 to turn inwards and to compress the torsional spring 172, thereby causing the torsional spring 172 to be positioned in the locating hole 121, and therefore the SM card 30 is kept inside the open chamber 14 and the contacts 31 of the SM card 30 are respectively maintained in contact with the first terminals 21. When the SM card 30 ejected out of the open chamber 14, the torsional spring 172 is released to return the lever body 171 to its former position. When loading a memory stick 40, it is inserted into the open chamber 14 inside the housing 10 below the lever body 171, keeping the contacts of the memory stick 40 in close contact with the second terminals 22. When loading a SD card or multimedia memory card 50 (a SD card and a multimedia memory card can use a same slot), it is inserted into the open chamber 14 inside the housing 10 below the lever body 171. When set into position, the contacts of the SD card or multimedia memory card 50 are kept in close contact with the third terminals 23 respectively. When inserted a xD memory card 60 into the chamber 14 inside the housing 10 below the lever body 171, the contacts of the xD memory card 60 are kept in close contact with the fourth terminals 24 respectively.

Referring to FIG. 3 again, the relative positioning of the housing 10, first terminals 21, second terminals 22, third terminals 23, fourth terminals 24 and lever 17 of the memory card connector 1 is clearly seen. The first terminals 21 are disposed at the top. Among the first, second, third and fourth terminals, the number of the first terminals 21 is the greatest, and the pitch of the first terminals 21 is the smallest. The second terminals 22 are disposed below the first terminals 21. The number of the second terminals 22 is less than the first terminals 21. The pitch of the second terminals 22 is greater than the first terminals 21. The third terminals 23 are disposed below the second terminals 22. The number of the third terminals 23 is less than the first terminals 21 and greater than the second terminals 22. The pitch of the third terminals 23 is approximately equal to the second terminals 22 such that the second ends 222 of the second terminals 22 and the five longer third terminals 233 can be alternatively arranged at the same elevations. In order to bias the fourth terminals 24 from the third terminals 23, the first ends 241 of the fourth terminals are respectively turned inwards toward the third terminals 23 from two sides and then turned backwards toward the inside of the housing 10. The second ends 242 of the fourth terminals 24 are extended out of the housing 10 and curved upwards and then downwards. The fourth terminals 24 include a number, for example, 5 pieces of relatively spaciously spaced fourth terminals 243 for receiving the five pieces of longer third terminals 233. Further, the installation of the fourth terminals 23 in the memory card connector 1 is also an important feature of the present invention. At first, the housing 10 is set upside down, and then the fourth terminals 24 are respectively set in receiving chambers 15 and 16 in the back side of the housing 10, and then two lids 19 are fastened to the receiving chambers 15 and 16 to hold down the fourth terminals 24, keeping the second ends 242 of the fourth terminals 24 suspended outside the housing 10. Further, a detector 18 is installed in the housing 10 to detect the write protection status of a SM card 30. The detector 18 has one side inserted into the inside of the housing 10, and the other side inserted into the elongated slots 101.

Figure 4A:
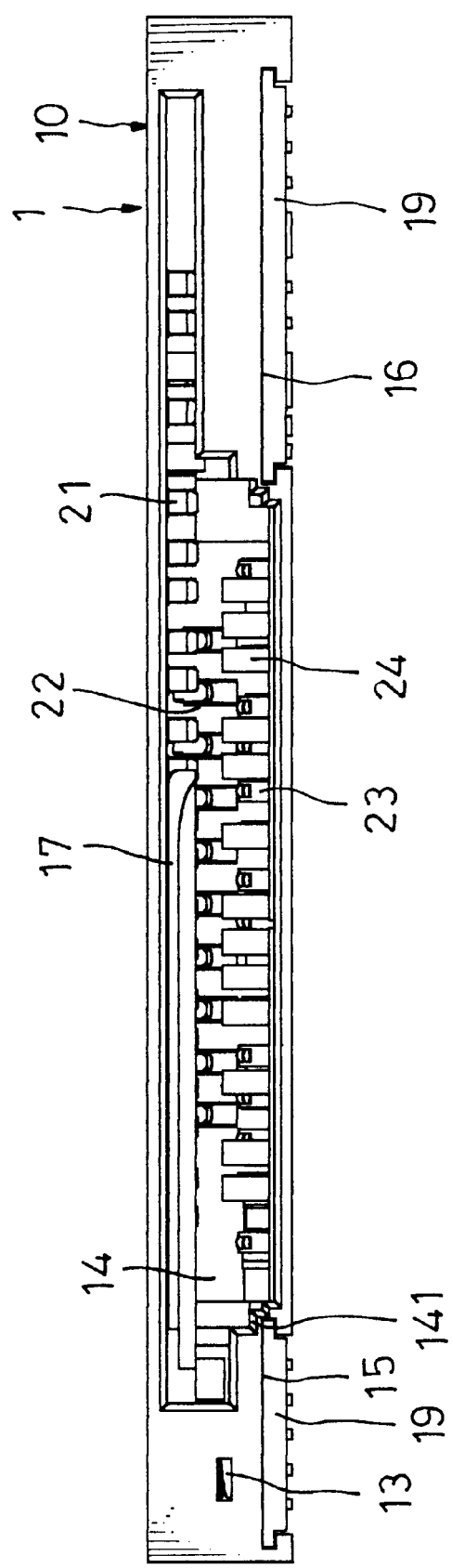
FIG. 4(*a*) is a front view of the memory card connector according to the present invention.

FIG. 4(a) is a front view of the memory card connector. As illustrated, the lever 17 is transversely suspended in the open chamber 14 at the top to prohibit insertion of any memory card except SM card 30 or memory stick 40. The terminals at the top side are the first terminals 21. The terminals on the middle are the second terminals 22. The terminals at the bottom side are the third terminals 23 and the fourth terminals 24 that are alternatively arranged at the same elevation. The receiving chambers 15 and 16 are bilaterally disposed in the bottom side of the housing 10.The lids 19 are fastened to the receiving chambers 15 and 16 to hold the fourth terminals 24 in position.

Figure 4B:
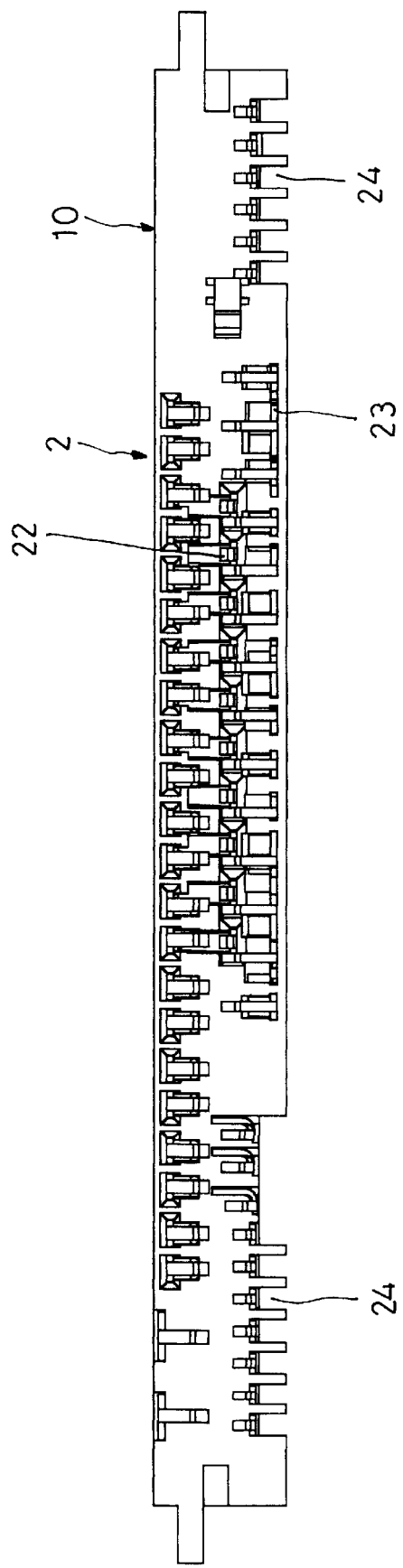

FIG. 4(b) is a rear view of the memory card connector according to the present invention. As illustrated, the first terminals 21 are disposed at the top side. The second terminals 22 and the third terminals 23 are alternatively arranged at different elevations below the first terminals 21. The fourth terminals 24 are bilaterally disposed in the bottom side of the housing 10.

Figure 4C:
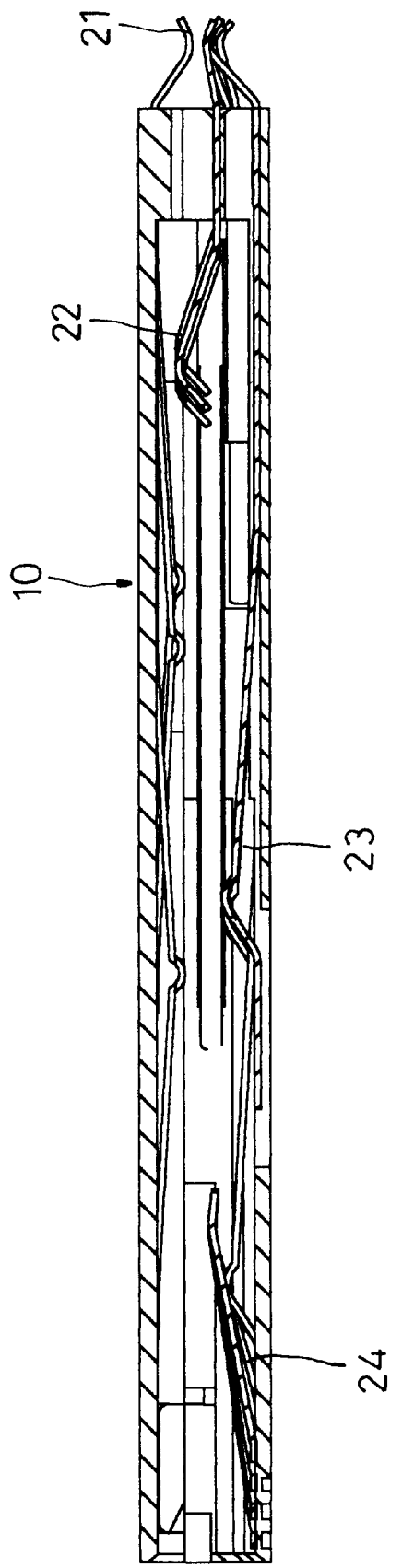

FIG. 4(c) is a sectional view of the memory card connector according to the present invention, showing the arrangement of the first terminals 21, the second terminals 22, the third terminals 23, and the fourth terminals 24 in the housing 10.

A prototype of memory card connector has been constructed with the features of FIGS. 1~4c. The memory card connector functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A memory card connector comprising a housing, said housing comprising a front side, a rear side, an open chamber extending to said front side for the insertion of a memory card into the inside of said housing, two stepped portions bilaterally disposed at a front side of said open chamber, a plurality of elongated slots and a recessed chamber arranged in a top wall thereof, and two locating notches symmetrically disposed at two sides thereof;

a plurality of first terminals mounted in said housing for the contact of a memory card, said first terminals each having a first end inserted from the rear side of said housing into the inside of said open chamber and said elongated slots, and a second end curved downwards and then upwards outside said housing;

a plurality of second terminals mounted inside said housing for the contact of a memory card, said second terminals each having a first end respectively inserted from the rear side of said housing into the inside of said open chamber and suspended below said first terminals, and a second end curved upwards and then downwards outside said housing;

a plurality of third terminals mounted inside said housing for the contact of a memory card, said third terminals each having a first end inserted from the rear side of said housing into the inside of said open chamber and suspended below said second terminals, and a second end curved upwards and then downwards and respectively suspended between the second ends of each two adjacent second terminals, said third terminals include longer third terminals and shorter third terminals;

a plurality of fourth terminals mounted inside said housing for the contact of a memory card, said fourth terminals each having a first end turned inwards at right angles and then backwards, and a second end turned upwards and then downwards outside said housing, said fourth terminals including a number of spaciously pitched fourth terminals to be alternatively arranged with said longer third terminals at same elevation;

a lever fastened pivotally with a part inside said housing and transversely suspended in the front side of said open chamber for controlling the insertion of an assigned memory card into said open chamber.

2. The memory card connector as claimed in claim 1, wherein said open chamber is adapted to accommodate one of a set of memory cards including SM card, memory stick, SD card, multimedia memory card, and xD memory card.

3. The memory card connector as claimed in claim 1, wherein said first terminals are adapted to receive a SM card.

4. The memory card connector as claimed in claim 1, wherein said second terminals are adapted to receive a memory stick.

5. The memory card connector as claimed in claim 1, wherein said third terminals are adapted to receive a SD card/multimedia memory card.

6. The memory card connector as claimed in claim 1, wherein said fourth terminals are adapted to receive a xD memory card.

7. The memory card connector as claimed in claim 1, wherein said lever comprises a lever body fastened pivotally with a part inside said housing, said lever body having a bottom receiving chamber near one end thereof, and a spring member, said spring member having one end fastened to the bottom receiving chamber of said ever body and an opposite end fastened to a locating hole in said recessed chamber.

8. The memory card connector as claimed in claim 1, wherein said locating notches of said housing hold a printed circuit board inside said open chamber, enabling said first terminals, said second terminals, said third terminals and said fourth terminals to be respectively electrically connected to said printed circuit board.

9. The memory card connector as claimed in claim 1, further comprising an indicator light adapted to indicate the working status of the memory card connector.

10. The memory card connector as claimed in claim 1, further comprising a detector installed in said housing and adapted to detect the write protection status of a SM card, said detector having one side inserted into the inside of said housing and an opposite side inserted into said elongated slots of said housing.

11. The memory card connector as claimed in claim 1, wherein said housing comprises two receiving chambers bilaterally disposed in a bottom side thereof adapted to accommodate said fourth terminals, and two lids respectively fastened to said receiving chambers to hold down said fourth terminals.

* * * * *